(12) United States Patent
Gollier

(10) Patent No.: US 8,963,808 B2
(45) Date of Patent: Feb. 24, 2015

(54) AUTOSTEREOSCOPIC DISPLAY DEVICE AND METHOD OF DISPLAYING IMAGE

(71) Applicant: Corning Incorporated, Corning, NY (US)

(72) Inventor: Jacques Gollier, Painted Post, NY (US)

(73) Assignee: Corning Incorporated, Corning, NY (US)

(*) Notice: Subject to any disclaimer, the term of this patent is extended or adjusted under 35 U.S.C. 154(b) by 158 days.

(21) Appl. No.: 13/662,635

(22) Filed: Oct. 29, 2012

(65) Prior Publication Data

US 2014/0118226 A1 May 1, 2014

(51) Int. Cl.
*G09G 3/00* (2006.01)

(52) U.S. Cl.
USPC ................................................ 345/32; 348/54

(58) Field of Classification Search
CPC .......... H04N 13/0404; H04N 13/0415; H04N 13/0468; H04N 13/047; H04N 13/0472; H04N 13/0475; H04N 13/0477; H04N 13/0479; H04N 13/0481; H04N 13/0484; G09G 3/003
USPC ........................ 345/1.1–1.3, 7–9; 348/42–60; 359/462–477
See application file for complete search history.

(56) References Cited

U.S. PATENT DOCUMENTS

| | | | |
|---|---|---|---|
| 6,943,788 B2 | 9/2005 | Tomono | 359/419 |
| 7,688,509 B2 | 3/2010 | Vissenberg et al. | 359/463 |
| 7,697,208 B2 | 4/2010 | De Zwart et al. | 359/626 |
| 8,011,786 B2 | 9/2011 | Hentschke | 353/7 |
| 2003/0067460 A1* | 4/2003 | Tomono | 345/419 |
| 2004/0240777 A1* | 12/2004 | Woodgate et al. | 385/16 |
| 2008/0204663 A1 | 8/2008 | Balogh | 353/10 |
| 2008/0231951 A1 | 9/2008 | De Zwart et al. | 359/463 |
| 2009/0180180 A1 | 7/2009 | Shimshi et al. | 359/462 |
| 2011/0102423 A1 | 5/2011 | Nam et al. | 345/419 |
| 2011/0310092 A1* | 12/2011 | de la Barre | 345/419 |
| 2012/0008056 A1* | 1/2012 | Gong | 349/15 |
| 2012/0140182 A1 | 6/2012 | Relke et al. | 353/7 |
| 2012/0314144 A1* | 12/2012 | Sugita et al. | 349/15 |

* cited by examiner

*Primary Examiner* — Gene W Lee
(74) *Attorney, Agent, or Firm* — Kevin M. Able

(57) ABSTRACT

An autostereoscopic display device includes a pixelated image source, a lenticular element and an optical splitting element. The pixelated image source includes a matrix of pixels and dark regions. The lenticular element includes a plurality of cylindrical lenses and is disposed adjacent the pixelated image source such that each of the cylindrical lenses extends over a substantially equal area of dark regions. The optical splitting element is configured such that a first eye sees first sub-pixels located along first parallel lines behind each of the cylindrical lenses with respect to the observer and a second eye sees second sub-pixels located along second parallel lines behind each of the cylindrical lenses. The first parallel lines and the second parallel lines are parallel with the cylindrical lenses. The first parallel lines extend over three neighboring sub-pixels within each of the rows. The second parallel lines extend over three neighboring sub-pixels within each of the rows.

19 Claims, 3 Drawing Sheets

AUTOSTEREOSCOPIC DISPLAY DEVICE AND METHOD OF DISPLAYING IMAGE

TECHNICAL FIELD

The present disclosure relates autostereoscopic display devices and, more particularly, apparatus and methods for reducing visual flaws occurring in autostereoscopic display devices.

BACKGROUND

Autostereoscopic display devices create an impression of three-dimension (3-D) without the use of special headgear or glasses by the observer. While a variety of methods exist for enabling autostereoscopic display devices, these methods usually entail some visual flaws that are experienced by the observer and may make it difficult for the observer to see 3-D images of satisfactory quality with clarity, for an extended period of time, from various viewing angles or locations, etc. Thus, there is a need to improve upon the shortcomings present in the existing technology for autostereoscopic display devices.

SUMMARY

In one example aspect, an autostereoscopic display device includes a pixelated image source, a lenticular element and an optical splitting element. The pixelated image source is located along a pixel plane and includes a matrix of pixels and dark regions substantially filling a remainder of the pixelated image source. The matrix is made of rows and columns of sub-pixels and each of the pixels is defined by a red sub-pixel, a green sub-pixel and a blue sub-pixel. The sub-pixels are of same color along each of the columns and are arranged in a sequence of red, green and blue along each of the rows. The lenticular element is located between the pixel plane and an observer plane. The observer plane is defined as a plane along which a first eye and a second eye of an observer are located. The lenticular element includes a plurality of cylindrical lenses and is disposed adjacent the pixelated image source such that each of the cylindrical lenses extends over a substantially equal area of dark regions. The optical splitting element is located between the pixel plane and the observer plane. The optical splitting element and the lenticular element are configured such that the first eye sees first sub-pixels located along first parallel lines behind each of the cylindrical lenses with respect to the observer and the second eye sees second sub-pixels located along second parallel lines behind each of the cylindrical lenses. The first parallel lines and the second parallel lines are parallel with the cylindrical lenses. The first parallel lines are spaced apart such that the first parallel lines extend over three neighboring sub-pixels within each of the rows. The second parallel lines are spaced apart such that the second parallel lines extend over three neighboring sub-pixels within each of the rows. The first sub-pixels are configured to display first image components, and the second sub-pixels are configured to display second image components.

In another example aspect, a method of displaying an image to an observer is provided. The method includes a step of providing a pixelated image source along a pixel plane. The pixelated image source includes a matrix of pixels and dark regions substantially filling a remainder of the pixelated image source. The matrix is made of rows and columns of sub-pixels. Each of the pixels is defined by a red sub-pixel, a green sub-pixel and a blue sub-pixel. The sub-pixels are of same color along each of the columns, and are arranged in a sequence of red, green and blue along each of the rows. The method further includes a step of providing a lenticular element between the pixel plane and an observer plane. The observer plane is defined as a plane along which a first eye and a second eye of an observer are located. The lenticular element includes a plurality of cylindrical lenses. The lenticular element is disposed adjacent the pixelated image source such that each of the cylindrical lenses extends over a substantially equal area of dark regions. The method further includes a step of providing an optical splitting element between the pixel plane and the observer plane such that the first eye sees first sub-pixels located along first parallel lines behind each of the cylindrical lenses with respect to the observer and the second eye sees second sub-pixels located along second parallel lines behind each of the cylindrical lenses with respect to the observer. The first parallel lines and the second parallel lines are parallel with the cylindrical lenses. The first parallel lines are spaced apart such that the first parallel lines extend over three neighboring sub-pixels within each of the rows. The second parallel lines are spaced apart such that the second parallel lines extend over three neighboring sub-pixels within each of the rows. The first sub-pixels are configured to display first image components, and the second sub-pixels are configured to display second image components.

BRIEF DESCRIPTION OF THE DRAWINGS

These and other aspects are better understood when the following detailed description is read with reference to the accompanying drawings, in which.

DETAILED DESCRIPTION

Figure 1:
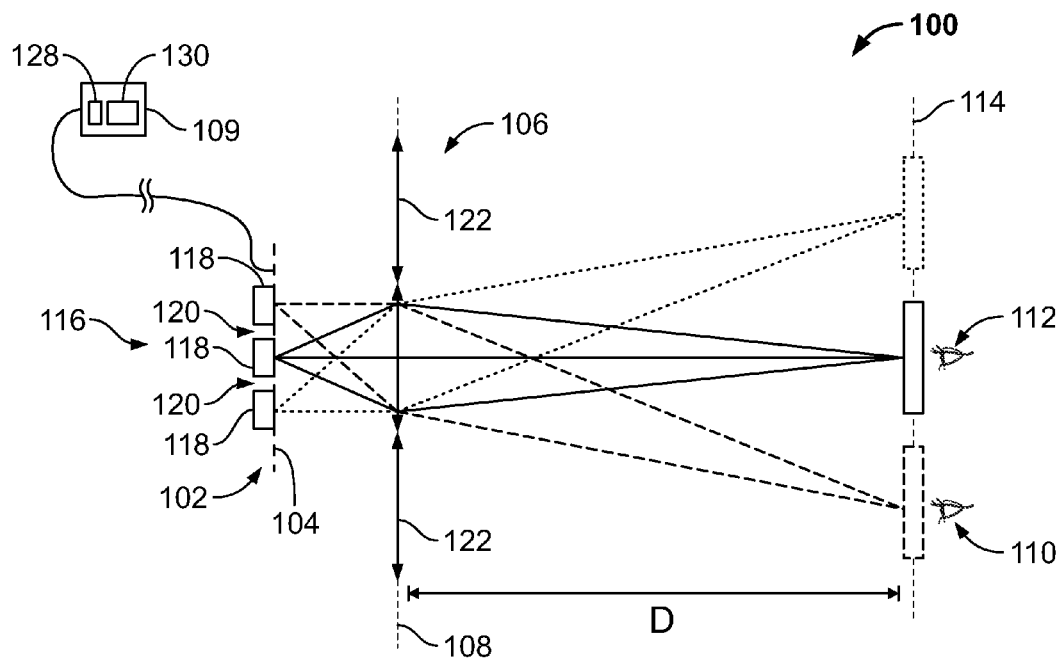
FIG. 1 is a schematic top view of components in a conventional auto stereoscopic display device.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Referring now to FIG. 1, a top view of certain components in a conventional autostereoscopic display device 100 are schematically illustrated. The conventional autostereoscopic display device 100 may include a screen (not shown), such as a glass cover, a pixelated image source 102 located along a pixel plane 104, a lenticular element 106 including a row of cylindrical lenses 122 which are indicated by arrows along an optical plane 108, and a processor 109 configured to adjust the contents of the pixelated image source 102. A first eye 110 and a second eye 112 of an observer are located on an observer plane 114 which may be at a given distance from the conventional autostereoscopic display device 100. As such, the pixelated image source 102 is behind the lenticular element 106 with respect to or from the perspective of the observer. The presence of the lenticular element 106 causes the first eye 110 and the second eye 112 to see slightly different images that create an impression of 3-D as shown in FIG. 1. The optical plane 108 is located between the pixel plane 104 and the observer plane 114 but the distance between the optical plane and the pixel plane may be orders of magnitude smaller than the distance between the optical plane and the observer plane (i.e., observation distance D indicated by the arrow in FIG. 1) unlike what is schematically shown in FIG. 1. It must be noted that a parallax-barrier may be used instead of a lenticular element 106.

The pixelated image source 102 may be formed of a matrix of pixels 116 in which each pixel 116 is made of a red sub-pixel 118a, a green sub-pixel 118b and a blue sub-pixel 118c. The matrix may be arranged in columns and rows extending along the pixel plane 104 where each column includes sub-pixels 118 of the same color and where the sub-pixels 118 are arranged in a sequence of red, green and blue along each of the rows. Each sub-pixel 118 may be surrounded by dark regions 120 such that the dark regions 120 fill the area between neighboring sub-pixels 118 and thus the remainder of the pixelated image source 102.

The pixelated image source 102 with the aforementioned configuration may be described as having a sub-pixel duty factor of a given value which is calculated by dividing the width of a sub-pixel 118 by the pitch of a pixel 116 where the pitch is measured along the rows of the matrix. Generally, the pitch of a pixel 116 includes the space created by dark regions 120 present between sub-pixels 118. In one example, the sub-pixels 118 may be spaced apart by the dark regions 120 so that the sub-pixel duty factor of the pixelated image source 102 is 0.25 or 25%.

Figure 2:
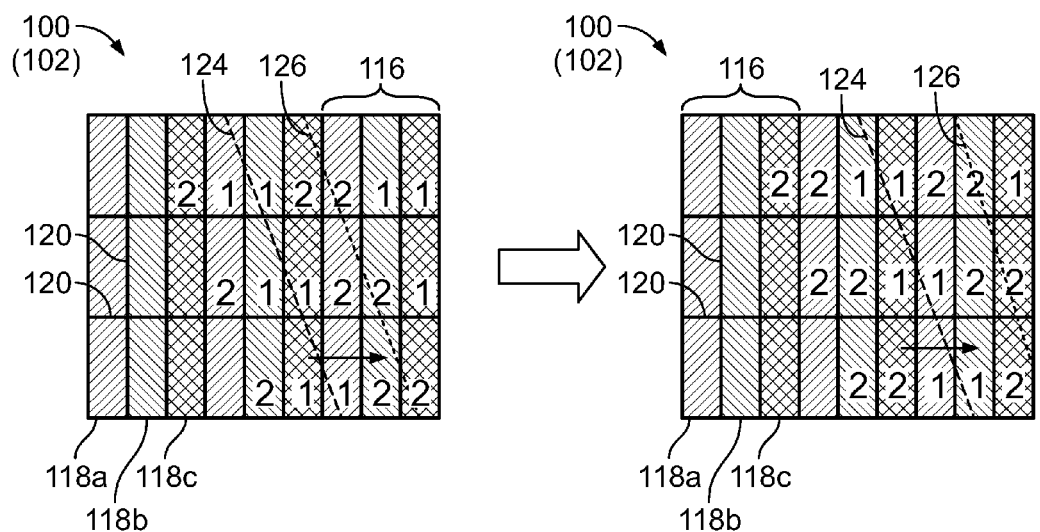
FIG. 2 shows schematic views of an example embodiment of a pixelated image source in which images displayed by sub-pixels are adjusted based on a location of an observer as known in the art.

Autostereoscopic display devices are configured such that the first eye 110 sees a first image component and the second eye 112 sees a second image component through each of the cylindrical lenses 122. Moreover, the eyes 110, 112 see sub-pixels 118 located along lines parallel to the cylindrical lenses 122. Specifically, in the conventional display device 100 of FIG. 1, the first eye 110 sees sub-pixels 118 located along a first line 124 (i.e., part of the first image component) and the second eye 112 sees sub-pixels located along a second line 126 (i.e., part of the second image component), located adjacent to the first line 124, through a single cylindrical lens 122 as illustrated in FIG. 2. As such, the lines 124, 126 may be termed lines of vision.

The spacing between the lines of vision 124, 126 can be calculated, to a first approximation, with the equation: $dy=F*E/D$, where $dy$ is the separation between the lines of vision 124, 126 in the pixel plane, F is the focal length of a lens (e.g., cylindrical lens 122), E is the separation between the eyes of the observer, and D is the observation distance (i.e., the distance from the observer plane to the optical plane (or the pixel plane)).

In a conventional autostereoscopic display device 100, the dark regions 120 within the pixelated image source 102 may cause a visual flaw that needs to be addressed when cylindrical lenses 122 are placed in front of the pixelated image source 102. If the area of the dark regions 120 behind each of the cylindrical lenses 122 with respect to the observer is not the same, the observer will experience what is called a Moiré effect, which can be described as periodic intensity variation across an image shown by the pixelated image source. In order to reduce the Moiré effect, the lenticular element 106 should be disposed about the pixelated image source 102 such that the area of the dark regions 120 behind each of the cylindrical lenses 122 is substantially the same or the same. One manner of accomplishing this is to rotate the lenticular element 106 so that the cylindrical lenses 122 are at an angle relative to the columns of the pixelated image source 102. For example, the lenticular element 106 may be rotated about the pixelated image source 102 so that the lines of vision 124, 126 pass through diagonally opposite corners of a sub-pixel 118.

Another issue with conventional autostereoscopic display devices 100 is that the eyes 110, 112 see the correct first and second image components only if the observer is standing at certain viewing positions along the observer plane 114. If the positions of the eyes 110, 112 are moved laterally along the observer plane, it may be possible for the eyes 110, 112 to see images that are inverted, of inferior quality, etc.

In order to address this issue of viewing positions for an embodiment where the lenticular element 106 is at an angle about the pixelated image source 102, a predetermined number of adjacent sub-pixels 118 along a row are configured to be part of the same image component (FIG. 2), and the spacing between the lines of visions 124, 126 for the first eye 110 and the second eye 112 needs to be increased in proportion with the increase in the predetermined number of sub-pixels 118. As denoted by 1's and 2's in FIG. 2, every two adjacent sub-pixels 118 display the same image component and the spacing between the lines of visions 124, 126 is increased by a pitch of a sub-pixel 118 such that the spacing between the lines of visions 124, 126 is equal to two pitches of a sub-pixel 118. Of course, the predetermined number of sub-pixels 118 may be more than two and the spacing between the lines of vision 124, 126 can be further widened.

Moreover, the processor 109 of the autostereoscopic display device 100 may include a head/eye tracking sensor 128 configured to determine a position of the observer and a controller 130 configured to adjust the image components based on the lateral movement of the observer along the observer plane 114 so that the sub-pixels 118 that lie along the lines of vision 124, 126 as determined by the new position of the observer (matrix on the right) rather than sub-pixels 118 that lie along the lines of vision 124, 126 determined from the previous position (matrix on the left) form the image components. Specifically, in FIG. 2, the image components, denoted by 1's and 2's, shift to the right to adjust to the lines of vision 124, 126 being shifted to the right by the rightward movement of the observer. In other words, by using an eye tracking system, the position of the right eye and the left eye lines of vision 124 and 126 can be determined and the image can be calculated such that all the pixels that are under the left eye line of vision contain the information of the left eye image and that all the pixels that are under the right eye line of vision contain the information of the right eye image.

Yet another visual flaw that can exist in autostereoscopic display devices 100 is image graininess which can be described as colored geometric lines covering the entire image. Image graininess arises because the lines of vision 124, 126 extend across pixels of different colors. Specifically, when the color white is intended to be displayed, a combination of differently colored lines are seen instead while, when a specific color is intended to be displayed, a combination of bright and dark spots are seen. That is, when a white image is displayed all red (R), green (G) and blue (B) pixels are switched on. However, since the lines of vision are only crossing specific sub-pixels that are either red, green or blue, the image will look like a checkerboard of the three colors.

The present disclosure describes autostereoscopic display devices 1 that can reduce all of the aforementioned visual flaws including the Moiré effect, image graininess, and those visual flaws arising from changes in the viewing position.

Certain aforementioned features discussed with regard to the conventional autostereoscopic display device 100 may also be present in the autosterescopic display device 1 including the additional features discussed below. The same reference numerals will be used for features also present in the autostereoscopic display device with fewer resultant visual flaws. The autostereoscopic display device 1 may be different from the conventional autostereoscopic display device 100 in that the autostereoscopic display device 1 includes an optical splitting element 132 that is located between the pixel plane 104 and the observer plane 114.

Figure 3:
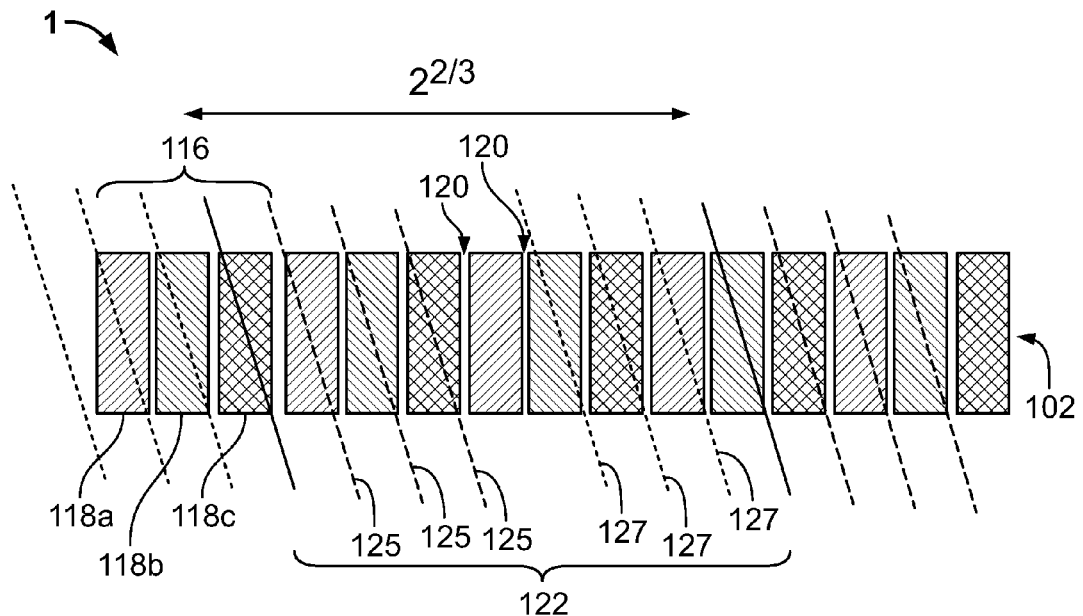
FIG. 3 is a schematic front view of a first example embodiment of an autostereoscopic display device in which a lenticular element is rotated at an angle relative to columns of a pixelated image source and in which first lines of vision and second lines of vision are split into first parallel lines and second parallel lines respectively by an optical splitting element.

In a first embodiment of the autostereoscopic display device 1 in which the cylindrical lenses 122 are at an angle relative to the columns of the matrix of the pixels 116 in order to reduce the Moiré effect (FIG. 3), the autostereoscopic display device 1 further includes an optical splitting element 132 that is configured to split the first line 124 and the second line 126 into first parallel lines 125 and second parallel lines 127. The first parallel lines 125 and the second parallel lines 127 are oriented parallel to the first line 124 and the second line 126, respectively, and extend over at least three neighboring sub-pixels 118 (i.e., a red sub-pixel, a green sub-pixel and a blue sub-pixel but not necessarily in this order) within a row. This may be illustrated by considering a parallel ray of light coming from one observer eye in the direction of the display. That ray will first strike the splitting element which will split the light in three different direction. As an example, the splitting element can be a diffraction grating diffracting light in multiple orders of diffraction. The cylindrical lens will then focus the light in the plane of the pixels. However, since the light has been split in multiple directions, the light will be focused at different places. This forms multiple lines of visions for each eye. If the distance between those sub lines is approximately equal to the pitch of the sub-pixels, then, each eye will simultaneously see the three colors, and image graininess disappears. In an example shown in FIG. 3, the lines of vision 124, 126 may be split into three first parallel lines 125 where the first parallel lines 125 are offset or spaced apart from each other by distance corresponding to about one pitch of a sub-pixel 118 when measured along the rows. The term "about" is used to take into account the spacing created by the dark regions 120 between the sub-pixels 118. Moreover, as shown in FIG. 3, the very right first parallel line 125 may be offset or spaced apart from the very left second parallel line 127 by a distance corresponding to about two pitches of a sub-pixel 118 when measured along one of the rows. Furthermore, the pitch of a cylindrical lens 122 may be dimensioned to extend over about two and two-thirds pitches of a pixel 116. This embodiment, as well as embodiments discussed hereinafter, may include the processor 109 with the head/eye tracking sensor 128 and the controller 130 in order to determine the position of the observer and to adjust the image components based on the position of the observer. As described above, the algorithm may include determining where the lines of visions 124 and 126 are located in the display and the brightness of the display sub-pixels may be adjusted such that all sub-pixels that are on line of vision 124 display left image information while all sub-pixels that are on line of vision 126 display right image information (or vice versa).

A consequence of the pitch of each cylindrical lens 122 having a length corresponding to two and two-thirds pixels 116 is that the image resolution in the horizontal direction is lowered. The deteriorating effect on resolution arising from the dimensions of the cylindrical lens 122 can be alleviated by reducing the spacing between the first parallel lines 125 and the second parallel lines 127 (i.e., the spacing between the very right first parallel line 125 and the very left second parallel line 127) to less than about two sub-pixels 118 and the in-between spacing between a first parallel line 125 and an adjacent first parallel line 125 (or the in-between spacing between a second parallel line 127 and an adjacent second parallel line 127) to less than about one sub-pixel 118 (e.g., one-fifth of a pitch of a pixel 116). With such a configuration, image graininess remains but the deteriorating effect on resolution is reduced.

In a second embodiment of the autostereoscopic display device 1, the cylindrical lenses 122 are parallel with the columns of the matrix of pixels 116 but the pitch of the cylindrical lenses 122 are dimensioned such that the area of the dark regions 120 behind each of the cylindrical lenses 122 is substantially the same. Such a configuration significantly reduces the Moiré effect as discussed above. Moreover, in order to reduce image graininess, the lines of vision 124, 126 are split by the optical splitting element 132 to extend parallel to the cylindrical lenses 122 and the columns of the matrix. In the example embodiment shown in FIG. 4, the lines of vision 124, 126 can be split into four lines 129, 131 respectively such that three of the lines 129, 131 extend over three neighboring sub-pixels 118 (i.e., a red sub-pixel, a green sub-pixel, and a blue sub-pixel but not necessarily in this order) within a row and one of the lines 129, 131 extend over dark regions 120. The spacing between one of the lines 129, 131 and an adjacent one of the lines 129, 131 may be about one-quarter of a pitch of a pixel 116. The duty factor of the sub-pixels, defined as the width of the sub-pixel divided by the pitch of the pixels, may be set to about 25%. This embodiment may also include the processor 109 with the head/eye tracking sensor 128 and the controller 130 in order to determine the position of the observer and to adjust the image components based on the position of the observer. As described above, the algorithm include determining where the lines of vision 129 and 131 are located in the display, and the brightness of the display sub-pixels may be adjusted such that all sub-pixels that are on line of vision 129 display left image information while all sub-pixels that are on line of vision 131 display right image information (or vice versa)

Figure 5:
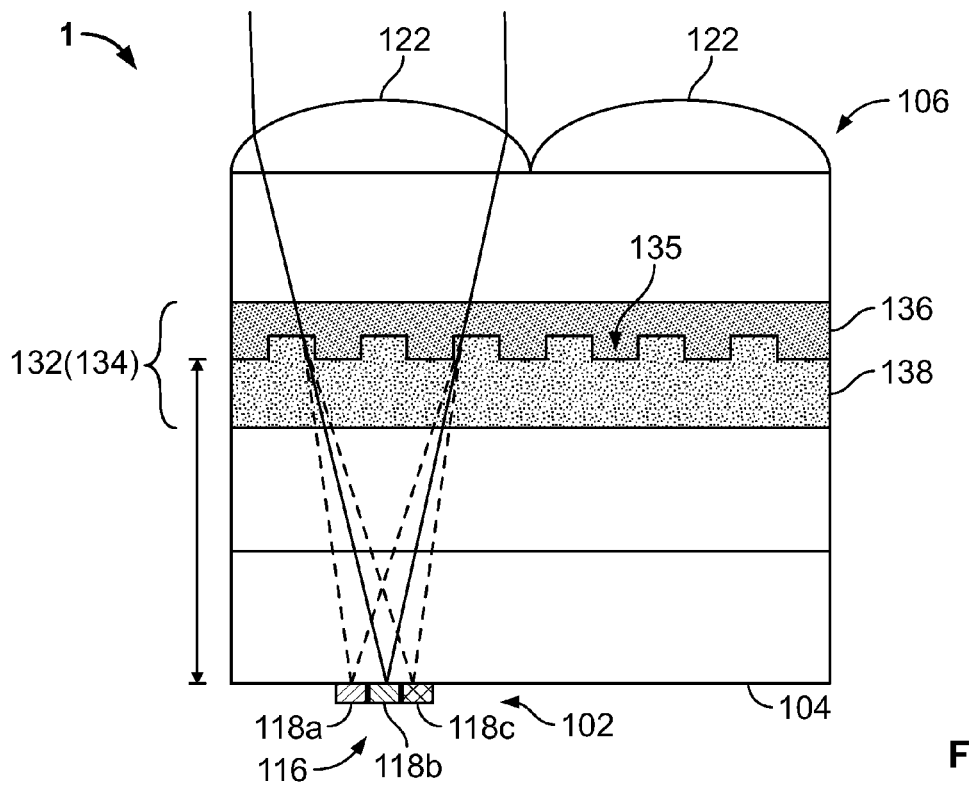
FIG. 5 is a schematic cross-sectional view of the autostereoscopic display device including the lenticular element, a first example optical splitting element, and the pixelated image source.
Figure 6:
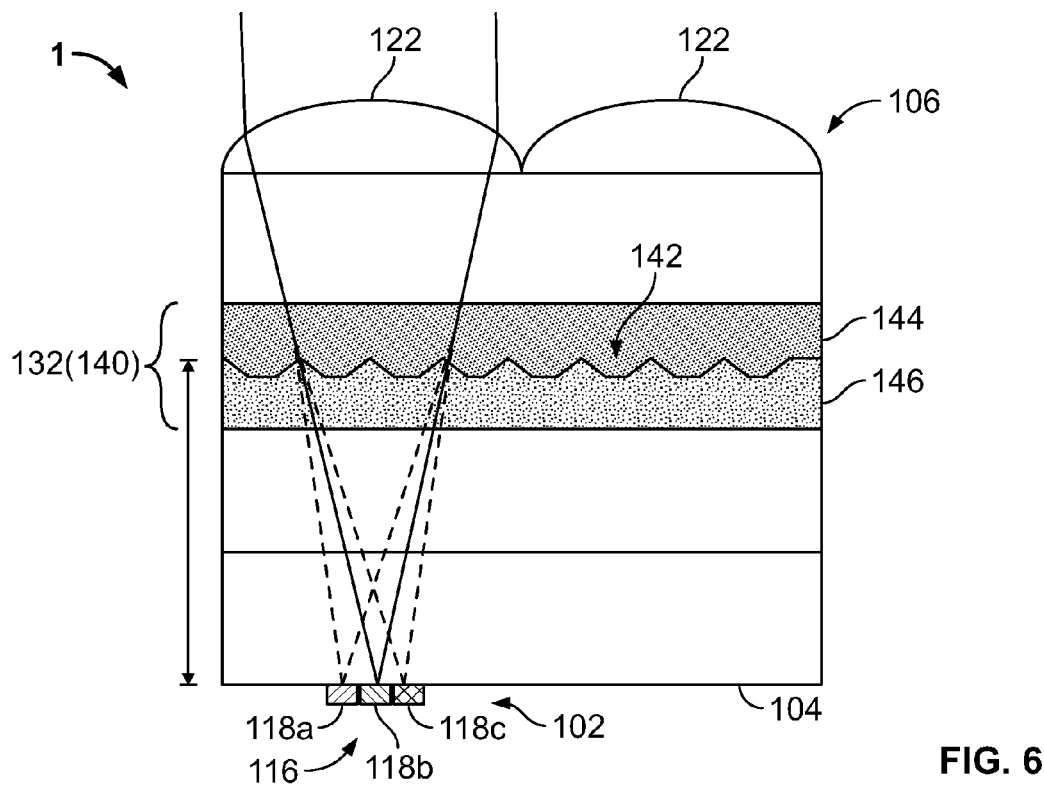
FIG. 6 is a schematic cross-sectional view of the autostereoscopic display device including the lenticular element, a second example optical splitting element, and the pixelated image source.

As shown in FIGS. 5-6, the autostereoscopic display device 1 including the optical splitting element 132 can be embodied in a variety of ways and may include layers other than the lenticular element 106 and the optical splitting element 132. For example, additional layers present between the lenticular element 106 and the pixelated image source 102 may include a polarizer, a color filtering substrate or other layers configured to adjust a distance between the lenticular element 106 and the pixelated image source 102.

As shown in FIG. 5, a first example embodiment of the optical splitting element 132 may be diffractive splitting elements 134 that may be embodied as a square-shaped grating between the lenticular element 106 and the pixelated image source 102. The embodiment shown in FIG. 5 divides each of the first and second lines of vision 124, 126 into three parallel lines 125, 127 such that the parallel lines 125, 127 extend over three neighboring sub-pixels 118. In case a line of vision 124 or 126 is split into three parallel lines 125 or 127, the spacing in-between the parallel lines may equal a third of a pixel pitch, for example, as shown in FIG. 3.

In one example embodiment in which one line of vision 124 or 126 is split into three parallel lines 125 or 127, the diffractive splitting elements 134 are configured to produce three equally distributed orders of diffraction (−1, 0, 1). The optical splitting element 132 may include a first layer 136 and a second layer 138 with different indices of refraction (i.e., n1 and n2 respectively) and where the boundary between the first layer 136 and the second layer 138 forms the grating 135. In order to obtain energy in orders −1, 0 and 1, a grating amplitude (e.g. the height of a square or twice the amplitude of a sine wave) should equal 0.68*(n2−n1) in case of a square-shaped grating (or 0.96*(n2−n1) in case of a sinusoidally shaped grating). Meanwhile, the period of the rectangular function should equal 0.53*(thickness from the boundary between the first layer 136 or 144 and the second layer 138 or 146 to the pixel plane 104)*(average refraction index for all the layers through which thickness is measured)*(average refraction index of the layers)/(pixel pitch). The thickness is indicated by the arrow in FIGS. 5-6.

It should be understood that multiple grating shapes can be considered as long as they satisfy the condition that most of the energy needs to be equally distributed between the three orders of diffraction −1, 0 and 1. Also, FIG. 5 shows gratings located on the back side of the cylindrical lenses. However, the grating could be placed anywhere in the optical path as long as the lines of vision are separated by the right amplitude as described in the previous embodiments.

Figure 4:
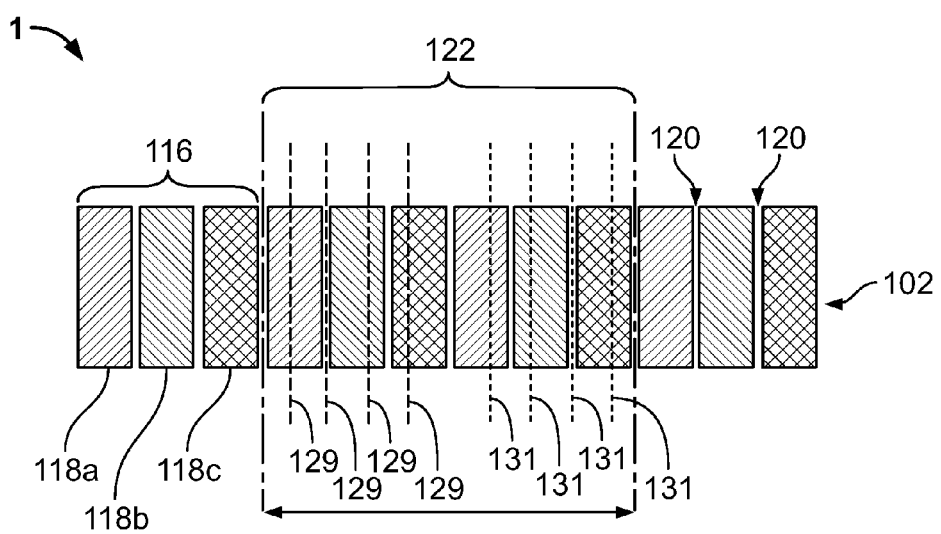
FIG. 4 is a schematic front view of a second example embodiment of the autostereoscopic display device in which the lenticular element is parallel relative to the columns of the pixelated image source and in which the first lines of vision and the second lines of vision are split into the first parallel lines and the second lines respectively by the optical splitting element.

Alternative embodiments of the diffractive splitting element 134 where the cylindrical lenses 122 are parallel with the columns of the matrix of pixels 118 (FIG. 4) may be configured to split a line of vision 124 or 126 into four parallel lines 129 or 131, one of which extends across dark regions 120 and three of which extend across three neighboring sub-pixels 118 as shown in FIG. 4. In case a line of vision 124 or 126 is split into four parallel lines 129 or 131, the spacing in-between two adjacent parallel lines 129 or 131 may equal a fourth of the pitch of a pixel 118, for example.

A second embodiment of the optical splitting element 132 may use refractive splitting elements 140 that may be embodied as multi-faceted prisms (polygons). This embodiment of the refractive splitting element 140, shown in FIG. 6, may include a first layer 144 and a second layer 146 the boundary of which form an array of three-facet prisms 142. This embodiment divides each of the first and second lines of vision 124 or 126 into three parallel lines 125 or 127 such that the parallel lines 125 or 127 extend over three neighboring sub-pixels 118. The pitch of the prisms 142 may be configured to be significantly smaller than the pitch of the cylindrical lenses 122 and may equal the pitch of one cylindrical lens 122 divided by an integer number. Similarly to the first embodiment of the optical splitting element 132, the refractive splitting elements 140 are compatible with an autostereoscopic display device 1 in which the cylindrical lenses 122 are parallel or at an angle relative to the columns of a matrix of pixels 116. In the case where the light needs to be split into more than three paths (e.g. four), the polygons may present more than three facets. The splitting element can be inserted anywhere in the optical path.

In an alternative embodiment of the autostereoscopic display device 1, it may be possible to incorporate the optical splitting element 132 into the lenticular element 106 by altering the curved shape of the cylindrical lens 122 at certain localized portions so as to create prismatic effects at these portions.

It will be apparent to those skilled in the art that various modifications and variations can be made without departing from the spirit and scope of the claimed invention.

What is claimed is:

1. An autostereoscopic display device including:
a pixelated image source located along a pixel plane, the pixelated image source including a matrix of pixels and dark regions substantially filling a remainder of the pixelated image source, the matrix made of rows and columns of sub-pixels, each of the pixels defined by a red sub-pixel, a green sub-pixel and a blue sub-pixel, the sub-pixels being of same color along each of the columns, the sub-pixels arranged in a sequence of red, green and blue along each of the rows;
a lenticular element located between the pixel plane and an observer plane, the observer plane defined as a plane along which a first eye and a second eye of an observer are located, the lenticular element including a plurality of cylindrical lenses, the lenticular element disposed adjacent the pixelated image source such that each of the cylindrical lenses extends over a substantially equal area of dark regions; and
an optical splitting element located between the pixel plane and the observer plane, wherein the optical splitting element is configured to split a first line of vision and a second line of vision into first parallel lines and second parallel lines respectively, and wherein the optical splitting element and the lenticular element are configured such that the first eye sees first sub-pixels located along the first parallel lines behind each of the cylindrical lenses with respect to the observer and the second eye sees second sub-pixels located along the second parallel lines behind each of the cylindrical lenses, the first parallel lines and the second parallel lines are parallel with the cylindrical lenses, the first parallel lines are spaced apart such that the first parallel lines extend over three neighboring sub-pixels within each of the rows, the second parallel lines are spaced apart such that the second parallel lines extend over three neighboring sub-pixels within each of the rows, the first sub-pixels configured to display first image components, the second sub-pixels configured to display second image components.

2. The display device of claim 1, further including a sensor configured to determine a position of the observer and a controller configured to adjust the first image components and the second image components based on the position of the observer determined by the sensor.

3. The display device of claim 1, wherein the lenticular element is rotated at an angle about the pixelated image source such that the cylindrical lenses are at an angle relative to the columns.

4. The display device of claim 1, wherein the lenticular element is disposed such that the cylindrical lenses are parallel to the columns of the matrix.

5. The display device of claim 1, wherein a pitch of each of the cylindrical lenses extends over at least two and two-thirds pixels when measured along one of the rows, the first parallel lines are offset by at least one sub-pixel from one another when measured along one of the rows, and the second parallel lines are offset by at least one sub-pixel from one another when measured along one of the rows.

6. The display device of claim 1, wherein a pitch of each of the cylindrical lenses extends over less than two and two-thirds pixels when measured along one of the rows, the first parallel lines are offset by less than one sub-pixel from one another when measured along one of the rows, and the second parallel lines are offset by less than one sub-pixel from one another when measured along one of the rows.

7. The display device of claim 1, wherein the optical splitting element includes a diffractive splitting element.

8. The display device of claim 7, wherein the diffracting splitting element is a periodic diffraction grating and light is equally distributed into multiple orders of diffraction.

9. The display device of claim 1, wherein the optical splitting element includes a refractive splitting element.

10. The display device of claim 9, wherein the refracting splitting element includes polygonal periodic structures.

11. The display device of claim 9, wherein the refracting splitting element includes polygonal periodic structures and a period of the polygonal periodic structures equals a period of the cylindrical lenses divided by an integer number.

12. A method of displaying an image to an observer, the image displayed by an autostereoscopic display device including a pixelated source and a lenticular element, the pixelated image source located along a pixel plane, the pixelated image source including a matrix of pixels and dark regions substantially filling a remainder of the pixelated image source, the matrix made of rows and columns of sub-pixels, each of the pixels defined by a red sub-pixel, a green sub-pixel and a blue sub-pixel, the sub-pixels being of same color along each of the columns, the sub-pixels arranged in a sequence of red, green and blue along each of the rows, the lenticular element located between the pixel plane and an observer plane, the observer plane defined as a plane along which a first eye and a second eye of an observer are located, the lenticular element including a plurality of cylindrical lenses, the lenticular element disposed adjacent the pixelated image source such that each of the cylindrical lenses extends over a substantially equal area of dark regions, the lenticular element configured such that the first eye sees first sub-pixels located along a first line of vision behind each of the cylindrical lenses with respect to the observer and the second eye sees second sub-pixels located along a second line of vision behind each of the cylindrical lenses with respect to the observer, the first sub-pixels configured to display first image components, and the second sub-pixels configured to display second image components, the method including a step of:

splitting the first line of vision and the second line of vision into first parallel lines and second parallel lines respectively, wherein the first parallel lines are spaced apart such that the first parallel lines extend over three neighboring sub-pixels within each of the rows, the second parallel lines are spaced apart such that the second parallel lines extend over three neighboring sub-pixels within each of the rows.

13. The method of claim 12, further including a step of determining a position of the observer with a sensor and adjusting the first image components and the second image components based on the position of the observer determined by the sensor.

14. The method of claim 12, wherein the lenticular element is rotated at an angle about the pixelated image source such that the cylindrical lenses are at an angle relative to the columns.

15. The method of claim 12, wherein the lenticular element is disposed such that the cylindrical lenses are parallel to the columns of the matrix.

16. The method of claim 12, wherein a pitch of each of the cylindrical lenses extends over at least two and two-thirds pixels when measured along one of the rows, the first parallel lines are offset by at least one sub-pixel from one another when measured along one of the rows, and the second parallel lines are offset by at least one sub-pixel from one another when measured along one of the rows.

17. The method of claim 12, wherein a pitch of each of the cylindrical lenses extends over less than two and two-thirds pixels when measured along one of the rows, the first parallel lines are offset by less than one sub-pixel from one another when measured along one of the rows, and the second parallel lines are offset by less than one sub-pixel from one another when measured along one of the rows.

18. The method of claim 12, wherein the step of splitting is conducted using diffractive splitting elements.

19. The method of claim 12, wherein the step of splitting is conducted using refractive splitting elements.

* * * * *